United States Patent
Lee et al.

(10) Patent No.: US 9,782,861 B2
(45) Date of Patent: Oct. 10, 2017

(54) METAL SHEET HOLDING DEVICE FOR MANUFACTURING PATTERN MASK

(71) Applicant: SAMSUNG DISPLAY CO., LTD., Yongin, Gyeonggi-Do (KR)

(72) Inventors: Choong-Ho Lee, Yongin (KR); Sung-Sik Yun, Yongin (KR); Tong-Jin Park, Yongin (KR); Doh-Hyoung Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 341 days.

(21) Appl. No.: 14/043,696

(22) Filed: Oct. 1, 2013

(65) Prior Publication Data

US 2014/0312546 A1 Oct. 23, 2014

(30) Foreign Application Priority Data

Apr. 17, 2013 (KR) .......................... 10-2013-0042369

(51) Int. Cl.

| | |
|---|---|
| *B23Q 3/154* | (2006.01) |
| *B23K 37/04* | (2006.01) |
| *B23K 26/18* | (2006.01) |
| *B23K 26/382* | (2014.01) |
| *B23K 26/0622* | (2014.01) |

(52) U.S. Cl.
CPC ...... *B23K 37/0408* (2013.01); *B23K 26/0624* (2015.10); *B23K 26/18* (2013.01); *B23K 26/382* (2015.10)

(58) Field of Classification Search
CPC .... B23Q 3/154; H01L 21/027; B23K 37/0408
USPC ...................... 269/903; 156/345.51; 279/128
See application file for complete search history.

(56) References Cited

U.S. PATENT DOCUMENTS

| | | | | |
|---|---|---|---|---|
| 4,502,094 A | * | 2/1985 | Lewin | H01L 21/6831 118/500 |
| 5,515,167 A | * | 5/1996 | Ledger | G03F 7/707 257/E21.53 |
| 6,184,972 B1 | * | 2/2001 | Mizutani | G03F 7/707 269/21 |
| 6,278,350 B1 | * | 8/2001 | Dorner | B23K 37/0408 269/8 |
| 7,505,118 B2 | * | 3/2009 | Yang | G03F 7/70425 355/72 |

(Continued)

FOREIGN PATENT DOCUMENTS

| | | |
|---|---|---|
| JP | 2001-341278 | 12/2001 |
| KR | 10-2010-0056833 | 5/2010 |

(Continued)

*Primary Examiner* — Larry E Waggle, Jr.
*Assistant Examiner* — Henry Hong
(74) *Attorney, Agent, or Firm* — Lewis Roca Rothgerber Christie LLP (57) ABSTRACT

A metal sheet holding device for manufacturing a pattern mask used in manufacturing processes of a flat panel displays include a first holder and second holder. The first holder includes an adhesive layer contacting edge portions of a metal sheet, and a first frame supporting the metal sheet using the adhesive layer. The second holder includes a second frame below the first frame, a supported plate positioned at the center of the second frame, and an adhered unit positioned between the central portion of a metal sheet and the supported plate. The adhered unit generates an electrostatic force or a magnetic force to hold the central portion of the metal sheet.

11 Claims, 4 Drawing Sheets

(56) References Cited

U.S. PATENT DOCUMENTS

| | | | |
|---|---|---|---|
| 2001/0055190 A1* | 12/2001 | Saito | B23Q 3/154 361/234 |
| 2002/0078889 A1* | 6/2002 | Welch | H01L 21/67259 118/668 |
| 2003/0029553 A1* | 2/2003 | Toyoda | B29C 31/006 156/230 |
| 2004/0055709 A1* | 3/2004 | Boyd, Jr. | B23Q 3/154 156/345.51 |
| 2007/0217119 A1* | 9/2007 | Johnson | H01L 21/6831 361/234 |
| 2009/0258583 A1* | 10/2009 | Thallner | B32B 43/006 451/289 |
| 2010/0052832 A1* | 3/2010 | Wang | B23Q 3/154 335/291 |
| 2010/0265631 A1* | 10/2010 | Stone | H01L 21/6831 361/234 |
| 2011/0272899 A1* | 11/2011 | Shimazu | H01L 21/67109 279/128 |
| 2013/0043363 A1* | 2/2013 | Thompson | B25B 11/002 248/317 |
| 2013/0249101 A1* | 9/2013 | Lin | H01L 24/96 257/773 |

FOREIGN PATENT DOCUMENTS

| | | |
|---|---|---|
| KR | 10-2010-0094802 | 8/2010 |
| KR | 20-2011-0001443 | 2/2011 |

* cited by examiner

METAL SHEET HOLDING DEVICE FOR MANUFACTURING PATTERN MASK

CROSS-REFERENCE TO RELATED APPLICATION

This application claims priority to and the benefit of Korean Patent Application No. 10-2013-0042369 filed in the Korean Intellectual Property Office on Apr. 17, 2013, the entire content of which is incorporated herein by reference.

BACKGROUND

1. Field

The described technology relates generally to a metal sheet holding device, and more particularly, a metal sheet holding device for manufacturing a pattern mask for manufacturing flat panel displays.

2. Description of the Related Art

Organic light emitting diode displays have been known to be used in flat panel displays. The organic light emitting diode display is provided with a pixel circuit and an organic light emitting diode (OLED) for each pixel, and displays an image by combining light emitted from a plurality of organic light emitting diodes. The organic light emitting diode includes a pixel electrode, an organic emission layer, and a common electrode.

An organic emission layer may be formed by a deposition method using the pattern mask. The pattern mask forms a plurality of opening parts corresponding to the organic emission layer and is fixed to a frame in a condition where tension is applied to the pattern mask. The pattern mask fixed to the frame is arranged on a substrate in a deposition chamber including a deposition source. Organic material that is evaporated from the deposition source is deposited on portions of the substrate that are exposed through the opening parts of the pattern mask, thus forming the organic emission layer.

The pattern mask can be a fine metal mask (FMM) formed of a metal sheet and is manufactured using, for example, invar (iron-nickel alloy), a stainless steel (SUS), or the like. In accordance with the development of laser micro-machining processes, research into a technology of forming the opening parts in the metal sheet using a picosecond (ps) laser (e.g., ultrashort pulse laser) has been conducted.

The above information disclosed in this Background section is provided for enhancement of understanding of the background of the described technology and therefore it may contain information that does not form prior art.

SUMMARY

The aspects of the present invention provides a metal sheet holding device capable of firmly fixing the metal sheet during a process of manufacturing a pattern mask by forming opening parts in the metal sheet using a laser micro-machining process.

The aspects of the present invention also provides a metal sheet holding device to maintain or support the metal sheet in a state in which the metal sheet is flat or substantially flat, thereby preventing deflection and increasing a position accuracy of the opening part, and to enable cleaning and inspection without separating the pattern mask after forming the opening part.

An example embodiment provides a metal sheet holding device, including a first holder having a first frame supporting a metal sheet, the metal sheet being coupled with the first frame via an adhesive layer between the first frame and edge portions of the metal sheet; a second holder having a second frame positioned below the first frame and an adhered unit positioned at a center of the second frame, the adhered unit being configured to generate an electrostatic force to hold the metal sheet by a central portion of the metal sheet; and a third holder comprising a backlight unit on a support supporting the backlight unit.

The metal sheet coupled with the first frame may be held tensioned in at least one direction by the adhesive layer.

The second holder may further include a supported plate below the adhered unit, thus supporting the central portion of the metal sheet and the adhered unit.

The metal sheet holding device may further include a power supply unit, wherein the adhered unit may have: an insulating plate contacting with the central portion of the metal sheet; and a transparent conductive layer at a lower surface of the insulating plate, wherein the power supply unit may be configured to apply a voltage to the metal sheet and the conductive layer.

The conductive layer may be on the lower surface of the insulating plate.

The conductive layer may have a plurality of conductive layers.

The plurality of conductive layers may extend in a first direction and may be arranged in rows along a second direction intersecting the first direction, wherein the plurality of conductive layers may be longer in the first direction than the second direction.

The plurality of conductive layers may be configured to sequentially receive the voltage from the center conductive layer to the outer conductive layers.

A laser machining process may be performed on the metal sheet, wherein the first holder, the second holder, and the third holder may be integrally assembled, and the metal sheet may be cleaned by a cleaning process, wherein the first holder may be separated from the second holder after performing the laser machining process.

The cleaning process may be an ultrasonic wave cleaning process using an acid cleaning solution, the adhesive layer may include an adhesive polymer that is non-reactive to the acid cleaning solution, and the first frame may include an engineering plastic that is non-reactive to the acid cleaning solution.

The first holder may be coupled with the second holder and the third holder after the cleaning process, and the backlight unit may be turned-on to facilitate an inspection and/or repair of the metal sheet.

A metal sheet holding device includes: a first holder having a first frame supporting a metal sheet, the metal sheet being coupled with the first frame via an adhesive layer between the first frame and edge portions of the metal sheet; and a second holder having a second frame positioned below the first frame and an adhered unit positioned at a center of the second frame, the adhered unit being configured to generate a magnetic force to hold the metal sheet by a central portion of the metal sheet.

The metal sheet coupled with the first frame may be held tensioned in one direction by the adhesive layer.

The second holder may further include a supported plate below the adhered unit, thus supporting the central portion of the metal sheet and the adhered unit.

The metal sheet holding device may further include a power supply unit, wherein the adhered unit includes: an insulating plate contacting the central portion of the metal sheet; and a plurality of electromagnets below the lower surface of the insulating plate, wherein the power supply unit may be coupled with each of the plurality of electromagnets.

The adhered unit may include: an insulating plate contacting the central portion of the metal sheet; and a permanent magnet below the insulating plate.

A laser machining process may be performed on the metal sheet, wherein the first holder and the second holder may be integrally assembled, and the metal sheet may be cleaned by a cleaning process, wherein the first holder may be separated from the second holder after performing the laser machining process.

The cleaning process may be an ultrasonic wave cleaning process using an acid cleaning solution, and the adhesive layer may include an adhesive polymer that is non-reactive to the acid cleaning solution, and the first frame may include an engineering plastic that is non-reactive to the acid cleaning solution.

A metal sheet holding device including: a first holder having a first frame supporting a metal sheet, the metal sheet being tensioned in at least one direction, and the first frame being coupled with the metal sheet by an adhesive layer; and a second holder having a second frame positioned below the first frame, a supported plate positioned at a center of the second frame, and an adhered unit positioned between a central portion of the metal sheet and the supported plate, wherein the adhered unit may be configured to generate an electrostatic force or a magnetic force to hold the central portion of the metal sheet.

DETAILED DESCRIPTION

Hereinafter, various aspects of the embodiments will be described in more detail with reference to the accompanying drawings so that those skilled in the art to which the present invention pertains may practice the various embodiments of the present invention. The embodiments of the present invention may be modified in various different ways and is not limited to the embodiments provided in the present description.

Throughout the present specification, unless explicitly described to the contrary, "comprising" any components will be understood to imply the inclusion of additional elements rather than the exclusion of any other elements. Further, throughout the present specification, it will be understood that when an element such as a layer, film, area, or substrate is referred to as being "on" or "over" another element, the element can be "directly on" the other element or intervening elements may also be present. In addition, the terms "on" or "over" are intended to mean that the element is positioned above or below the target element and it does not necessarily mean that is positioned upward with reference to the direction of gravity.

Figure 1:
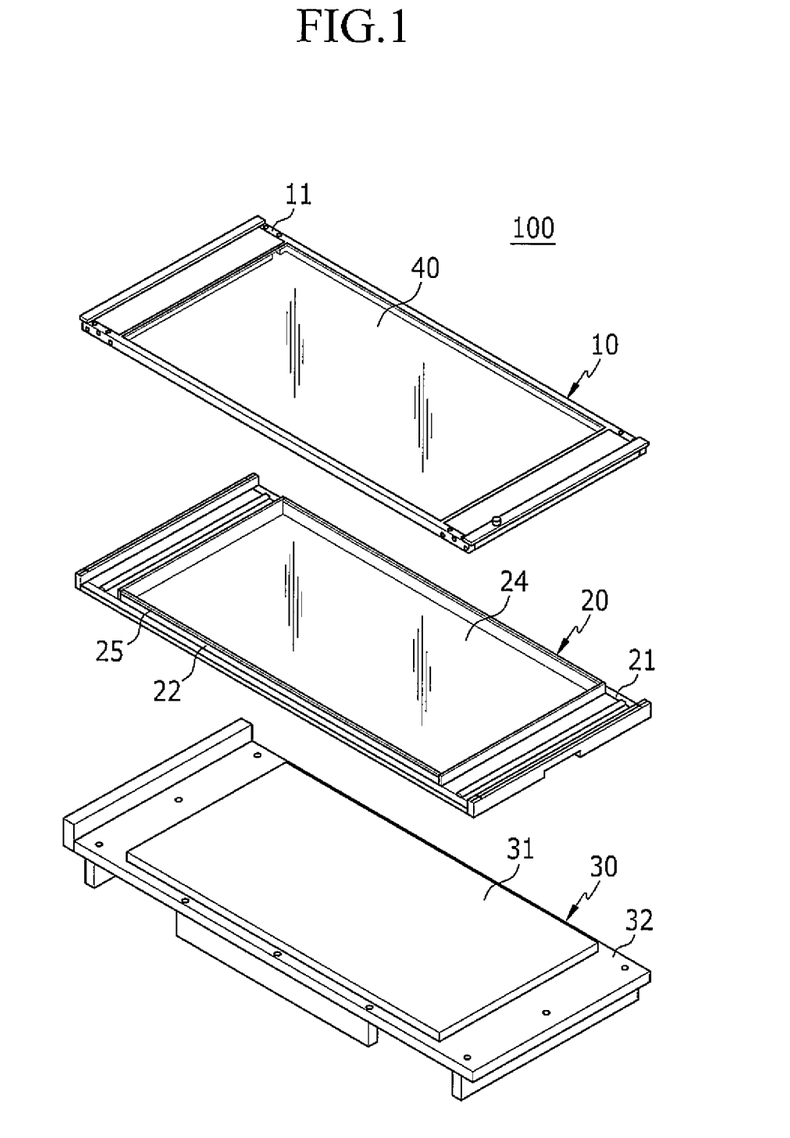
FIG. 1 is an exploded perspective view of a holding device according to a first example embodiment.
Figure 2:
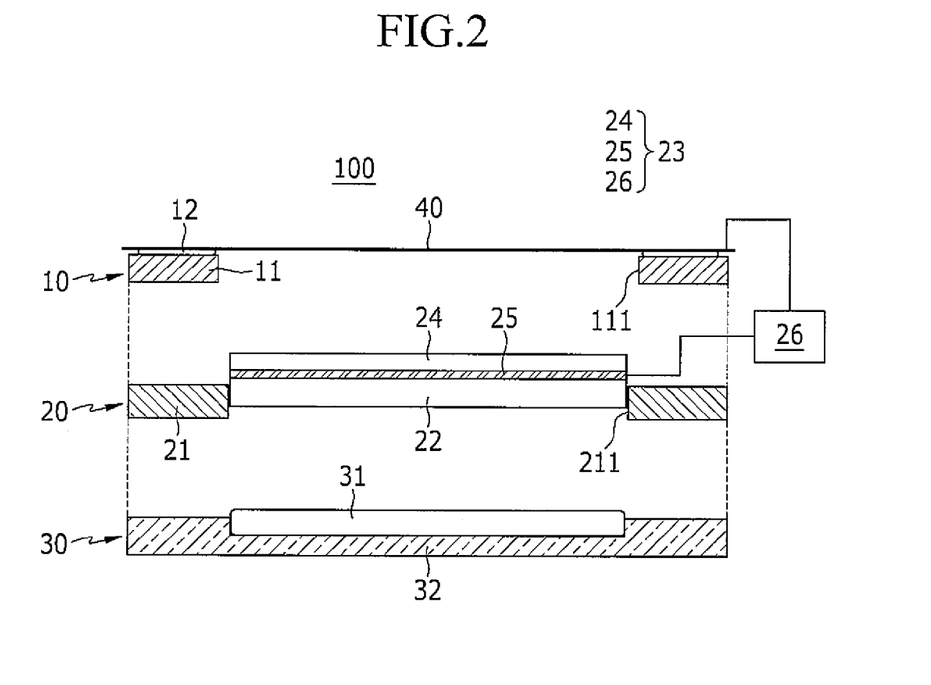
FIG. 2 is a cross-sectional view of the holding device shown in FIG. 1.
Figure 3:
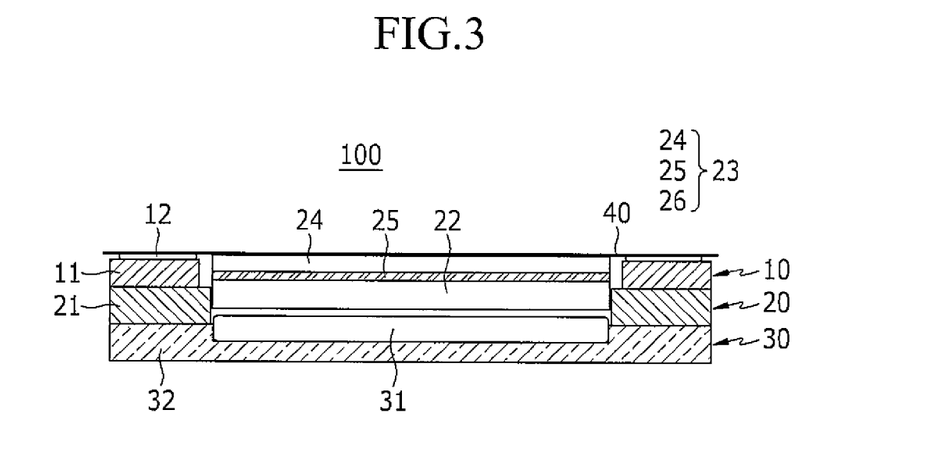
FIG. 3 is a cross-sectional view of the holding device shown in FIG. 2, coupled together.

FIG. 1 is an exploded perspective view of a holding device according to a first example embodiment, FIG. 2 is a cross-sectional view of the holding device shown in FIG. 1, and FIG. 3 is a cross-sectional view of the holding device shown in FIG. 2, coupled together.

Referring to FIGS. 1 to 3, the holding device 100 according to the first example embodiment includes a first holder 10, a second holder 20, and a third holder 30, one stacked over another.

As shown in FIGS. 1-3, a metal sheet 40 is positioned on the first holder 10, and the second holder 20 and the third holder 30 are positioned below the first holder 10. The first holder 10, the second holder 20, and the third holder 30 are integrally assembled to place into, for example, a laser machining device and may be separated from one another after the laser machining process.

In some embodiments, the first holder 10 includes the first frame 11 and an adhesive layer 12. The first frame 11 forms the first opening part 111 which opens the central portion of the metal sheet 40, and the adhesive layer 12 is positioned on the upper surface of the first frame 11.

Both side ends of the metal sheet 40 may be held on the first frame 11 by the adhesive layer 12 in a state in which tension is applied in one direction. In some embodiments, the entire edge of the metal sheet 40 may be held on the first frame 11 by the adhesive layer 12 in a state in which tension is applied in two directions. FIGS. 1 to 3 show a first example embodiment as one non-limiting example.

According to an embodiment, the second holder 20 includes a second frame 21 positioned below the first frame 11, a supported plate 22 positioned at the center of the second frame 21, and a closely adhered unit 23 (e.g., adhered unit) positioned between the central portion of a metal sheet 40 and the supported plate 22. According to the embodiment, the closely adhered unit 23 generates an electrostatic force to closely hold the metal sheet 40.

The second frame 21 forms a second opening part 211 corresponding to the first opening part 111, and the supported plate 22 is positioned at the second opening part 211. The supported plate 22 supports the central portion of the metal sheet 40 and the closely adhered unit 23, and has a flat or substantially flat upper surface formed on the side facing the metal sheet 40 to allow the flat or substantially flat closely adhered unit 23 and metal sheet 40 to be supported or maintained. The supported plate 22 may be formed of, for example, a glass plate having a thickness of about 5 mm or more.

According to an embodiment, the closely adhered unit 23 includes an insulating plate 24 supporting a central portion of the metal sheet 40, a conductive layer 25 positioned between the supported plate 22 and the insulating plate 24, and a power supply unit 26 coupled to the metal sheet 40 and the conductive layer 25. The insulating plate 24 may be a glass plate having a thickness that is smaller than of the thickness of the supported plate 22, and the conductive layer 25 is formed over the lower surface of the insulating plate 24.

To perform the laser machining process to form the opening part in the metal sheet 40, the metal sheet 40 and the conductive layer 25 are electrically coupled to the power supply unit 26 to receive a high voltage, for example, a voltage of about 1 kV to 5 kV. When the voltage is applied, the metal sheet 40 and the conductive layer 25 become a cathode (−) electrode and an anode (+) electrode, respectively, and generates an electrostatic force. Thus, the central portion of the metal sheet 40 is firmly adhered close to the insulating plate 24. Because the insulating plate 24 is positioned between the metal sheet 40 and the conductive layer 25, current does not flow between the metal sheet 40 and the conductive layer 25.

According to an embodiment, the third holder 30 includes a backlight unit 31 and a support 32 for supporting the backlight unit 31. The backlight unit 31 may be formed such that the size corresponds to the supported plate 22, and may be seated in a concave part formed in the support 32. The support 32 may be held by suction on a laser machining table and has a flat or a substantially flat lower surface to stably maintain the suction effect.

According to an embodiment, the backlight unit 31 is turned-on to inspect and/or repair the metal sheet 40 after the laser machining process by irradiating light toward the metal sheet 40 (pattern mask) where a plurality of the opening parts are formed. The lighting configuration of irradiating the light from the lower portion of the metal sheet 40 rather than irradiating the light from the upper portion of the metal sheet 40 may allow to easily detect defects of the metal sheet 40.

According to an embodiment, the supported plate 22, the insulating plate 24, and a conductive layer 25 are transparent so that the light emitted from the backlight unit 31 reaches the metal sheet 40. In some embodiments, the supported plate 22 and the insulating plate 24 are formed of a transparent glass and the conductive layer 25 is formed of a transparent conductive layer including at least one of indium tin oxide (ITO), indium zinc oxide (IZO), zinc oxide (ZnO), and indium oxide ($In_2O_3$).

According to an embodiment, the metal sheet 40 is positioned on the first holder 10 and is held on the first frame 11 by the adhesive layer 12 in a state in which the tension is applied in one or two directions. The adhesive layer 12 may not necessarily support the metal sheet 40 with a force that is as large as the closely adhered unit 23, but has sufficient power to keep the metal sheet 40 together with the closely adhered unit 23 without changing the tension in a flat or substantially flat state.

According to an embodiment, the first holder 10, the second holder 20, and the third holder 30 are integrally assembled by a coupling device such as, for example, a bolt and a nut, and is positioned on the laser machining table. Then, the metal sheet 40 and the conductive layer 25 are electrically coupled to the power supply unit 26, such that the central portion of the metal sheet 40 is firmly adhered to be close to the insulating plate 24 by the electrostatic force.

According to an embodiment, the laser machining device operates with the metal sheet 40 closely adhered to the insulating plate 24, and the plurality of opening parts are formed by the laser machining device performing a drilling process using an ultrashort pulse laser such as a picosecond (ps) laser on the metal sheet 40. During the laser machining process, because the metal sheet 40 is firmly adhered close to the insulating plate 24, the entire metal sheet 40 may remain flat or substantially flat without wrinkles.

Therefore, the opening parts of the metal sheet 40 in the laser machining process and in subsequent processes may be performed with high precision. In some embodiments, even though external force such as heat wind may be applied to the metal sheet 40 during the laser machining process, the precision of position of the opening parts can be improved without moving or modifying the metal sheet 40.

According to an embodiment, the first holder 10 is separated from the second holder 20 after the laser machining process is performed and is placed into a cleaning device to clean the metal sheet 40. An ultrasonic wave cleaning using an acid cleaning solution (for example, hydrochloric acid solution) may be performed to clean the metal sheet 40. According to an embodiment, the adhesive layer 12 is formed of an adhesive polymer that does not react with the cleaning solution (e.g., non-reactive to the acid cleaning solution), and the first frame 11 is formed of an engineering plastic having high rigidity while not reacting with the cleaning solution (e.g., non-reactive to the acid cleaning solution).

According to an existing laser machining process, the first holder 10, the second holder 20, and the third holder 30 all support the metal sheet 40. However, according to the embodiments of the present invention, because the second holder 20 and the third holder 30 are not soaked in the cleaning solution (to avoid damaging the conductive layer 25 and backlight unit 31), the first holder 10 supports the metal sheet 40.

After cleaning the metal sheet 40, the first holder 10 is again assembled with the second holder 20, and an inspection and/or repair processes of the metal sheet 40 using the backlight unit 31 is performed. The backlight unit 31 irradiates light from the lower portion of the metal sheet 40, thereby easily detecting any defects in the metal sheet 40 and/or areas where the process was not performed.

As described above, the holding device 100 according to the first example embodiment includes the backlight function, thereby facilitating inspection and repairs together with the laser machining process of the metal sheet 40. It is assumed in some embodiments that the backlight unit 31 is mounted in a separate inspection equipment, that the metal sheet 40 is separated from the holding device 10 after the laser machining process is performed and held again in the inspection equipment, and the metal sheet 40 may be deformed during this process.

However, the holding device 100 according to the first example embodiment does not hold, and the deformation of the metal sheet 40 may be prevented. In addition, in the holding device 100 according to the first example embodiment, the first holder 10 may be separately divided, such that the metal sheet 40 is easily cleanable.

Figure 4:
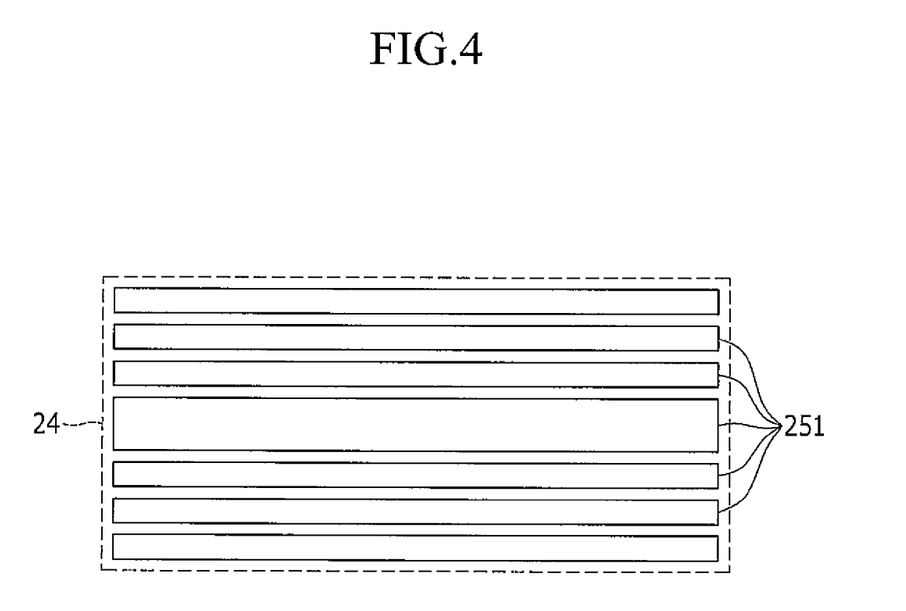
FIG. 4 is a plan view showing a conductive layer of a second holder of the holding device according to a second example embodiment.

FIG. 4 is a plan view showing a conductive layer of a second holder 20 among the holding devices according to a second example embodiment.

Referring to FIG. 4, the holding device of the second example embodiment has the same configuration as the first example embodiment described above except that a conductive layer 251 of the second holder 20 is divided into a plurality of conductive layers.

In the first example embodiment, the conductive layer 25 is formed over the lower surface of the insulating plate 24. In this case, the power supply is electrically coupled to the metal sheet 40 and the conductive layer 25, such that air may be trapped in an inner side of the metal sheet 40 during the process of closely adhering the metal sheet 40 to the insulating plate 24.

A plurality of the conductive layers 251 according to the second example embodiment is formed to extend relatively long in a first direction of the insulating layer 24, and is arranged along a row in a second direction intersecting with the first direction. FIG. 4 shows an example embodiment where a plurality of the conductive layer 251 formed to extend relatively long in a horizontal direction is arranged in rows along a vertical direction by way of example.

According to an embodiment, each conductive layer 251 is coupled to the power supply unit and receives a voltage sequentially. That is, the conductive layers 251 receive voltage sequentially from the conductive layer 251 at the center of the insulating plate 24 to the conductive layer 251 at the edge of the insulating layer 24. As a result, the central portion of the metal sheet 40 is first adhered to the insulating plate 24 to push any air toward the outside while adhering the insulating plate 24 toward the edge portion.

Therefore, the holding device of the second example embodiment may effectively suppress the air that may collect between the metal sheet 40 and the insulating plate 24.

Figure 5:
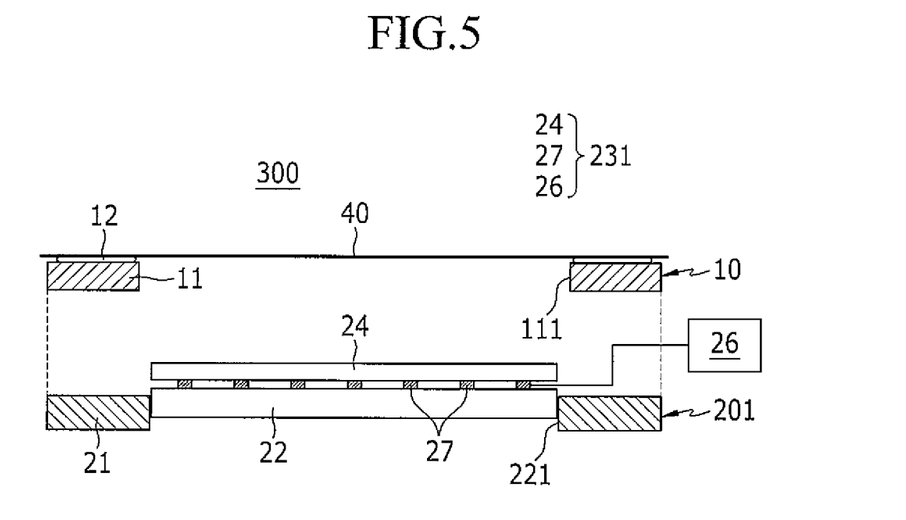
FIG. 5 is an exploded cross-sectional view of a holding device according to a third example embodiment.

FIG. 5 is an exploded cross-sectional view of a holding device according to a third example embodiment.

Referring to FIG. 5, the holding device 300 according to the third example embodiment includes the first holder 10 and the second holder 201, and does not include the third holder as in the first example embodiment. Because the first holder 10 is substantially the same as the first example embodiment, detailed description of the first holder 10 will not be provided.

According to the third example embodiment, the second holder 201 includes a second frame 21 positioned below the first frame 11, a supported plate 22 positioned at the center of the second frame 21, and a closely adhered unit 231 positioned between a metal sheet 40 and the supported plate 22, that generates a magnetic force to closely hold the metal sheet 40.

The second frame 21 forms a second opening part 211 corresponding to the first opening part 111, and the supported plate 22 is positioned at the second opening part 211. The supported plate 22 supports the central portion of the metal sheet 40 and the closely adhered unit 231, and has a flat or substantially flat upper surface formed on the side that faces toward the metal sheet 40 to allow the flat closely adhered unit 231 and metal sheet 40 to be maintained or supported. The supported plate 22 may be formed of a glass plate having a thickness of about 5 mm or more.

According to the embodiment, the closely adhered unit 231 includes the insulating plate 24 supporting the center portion of the metal sheet 40, a plurality of the electromagnets 27 positioned between the supported plate 22 and the insulating plate 24, and the power supply unit 26 coupled to each of the plurality of electromagnets 27. The insulating plate 24 may be, for example, a glass plate having a thickness smaller than the thickness of the supported plate 22, and the plurality of electromagnets 27 are spaced apart from each other at set intervals in the horizontal and the vertical directions of the insulating plate 24.

According to the embodiment, the power supply unit 26 is coupled to the plurality of the electromagnets 27 so that current is applied during the laser machining process of the metal sheet 40 to form the opening part. A magnetic force is generated by the electromagnets 27, and the metal sheet 40 is firmly adhered closely to the insulating plate 24 by the magnetic force. Therefore, the metal sheet 40 is firmly adhered to be close to the insulating plate 24. Even though external force such as heat wind may be applied to the metal sheet, the precision of the position of the opening part can be improved without moving or modifying the metal sheet 40.

Figure 6:
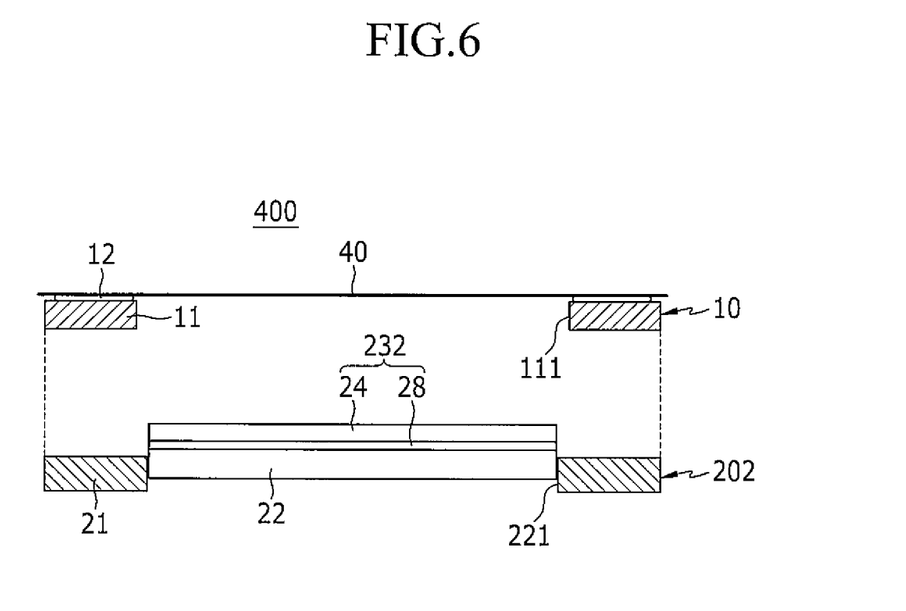
FIG. 6 is an exploded cross-sectional view of a holding device according to a fourth example embodiment.

FIG. 6 is an exploded cross-sectional view of a holding device according to a fourth example embodiment.

Referring to FIG. 6, the holding device 400 according to the fourth example embodiment has the same configuration as the third example embodiment mentioned above except a permanent magnet 28 is used instead of a plurality of the electromagnets. The same reference numerals will be used with respect to the same components as the third example embodiment.

The closely adhered unit 232 of the second holder 202 according to the fourth example embodiment includes the insulating plate 24 which supports the center portion of the metal sheet 40 and the permanent magnet 28 positioned between the supported plated 22 and the insulating plate 24. During the laser machining process, the metal sheet 40 is firmly adhered close to the insulating plate 24 by the magnetic force of the permanent magnet 28, and thus remain flat or substantially flat without any wrinkles.

In case of the third example embodiment including the electromagnets 27 and the fourth example embodiment including the permanent magnet 28, the center portion of the metal sheet 40 may be closely adhered to the insulating plate 24 with a force that is stronger than the force for the first and the second example embodiments using the electrostatic force. In the third and the fourth example embodiments, the first holder 10 is separated from the second holders 201 and 202 after the laser machining process, and is placed in the cleaning equipment device to wash the metal sheet 40.

Because the holding devices 300 and 400 according to the third and fourth example embodiments may be relatively difficult to apply the backlight function because light cannot be transmitted through the electromagnets 27 and the permanent magnet 28, the holding devices 300 and 400 are moved to the inspection equipment where front lighting is installed after the cleaning process such that an inspection and/or repair of the metal sheet 40 can be performed.

According to the example embodiments, the opening part of the metal sheet 40 in the laser machining process and in subsequent processes may achieve a relatively high position precision. In addition, during the laser machining process, even though external force such as heat wind may be applied to the metal sheet 40, the precision of the position of the opening part may be improved without moving or modifying of the metal sheet 40.

Although the various example embodiments have been described, the present invention is not necessarily limited to the described embodiments. Instead, variations may be practiced by modifying in many different forms within the scope of the appended claims, the detailed description of the invention, accompanying drawings, and their equivalents.

| Description of symbols | |
|---|---|
| 100, 300, 400: holding device | 10: the first holder |
| 11: the first frame | 12: adhesive layer |
| 20, 201, 202: the second holder | 21: the second frame |
| 22: supported plate | 23, 231, 232: closely adhered unit |
| 24: insulating plate | 25, 251: conductive layer |
| 26: power supply unit | 30: the third holder |
| 31: backlight unit | 32: support |

What is claimed is:

1. A metal sheet holding device, comprising:
   a first holder comprising a first frame supporting a metal sheet, the first frame defining an opening at a central region, the metal sheet being coupled with the first frame via an adhesive layer between the first frame and edge portions of the metal sheet;
   a second holder separable from the first holder, the second holder comprising a second frame positioned below the first frame and an adhered unit positioned at a center of the second frame, the adhered unit being receivable in the opening of the first frame and configured to generate an electrostatic force to hold the metal sheet by a central portion of the metal sheet; and
   a third holder comprising a backlight unit on a support supporting the backlight unit.

2. The metal sheet holding device of claim 1, wherein the adhesive layer is configured to hold the metal sheet in a state in which tension is applied to the metal sheet in at least one direction.

3. The metal sheet holding device of claim 1, wherein the second holder further comprises a supported plate below the adhered unit, thus supporting the central portion of the metal sheet and the adhered unit.

4. The metal sheet holding device of claim 1, further comprising a power supply unit, wherein the adhered unit comprises:
   an insulating plate contacting with the central portion of the metal sheet; and
   a transparent conductive layer at a lower surface of the insulating plate,
   wherein the power supply unit is configured to apply a voltage to the metal sheet and the conductive layer.

5. The metal sheet holding device of claim 4, wherein the conductive layer is on the lower surface of the insulating plate.

6. The metal sheet holding device of claim 4, wherein the conductive layer comprises a plurality of conductive layers.

7. The metal sheet holding device of claim 6,
   wherein the plurality of conductive layers extend in a first direction and is arranged in rows along a second direction intersecting the first direction,
   wherein the plurality of conductive layers is longer in the first direction than the second direction.

8. The metal sheet holding device of claim 7, wherein the plurality of conductive layers are configured to sequentially receive the voltage from the center conductive layer to the outer conductive layers.

9. The metal sheet holding device of claim 1, wherein:
   the first holder, the second holder, and the third holder are integrally assembled, and
   the metal sheet is configured to be cleaned by a cleaning process, wherein the first holder is separated from the second holder after performing a laser machining process.

10. The metal sheet holding device of claim 9, wherein:
    the adhesive layer comprises an adhesive polymer that is non-reactive to an acid cleaning solution used in the cleaning process, and
    the first frame comprises an engineering plastic that is non-reactive to the acid cleaning solution.

11. The metal sheet holding device of claim 9, wherein the first holder is configured to be coupled with the second holder and the third holder after the cleaning process, and the backlight unit is configured to be turned-on to facilitate an inspection and/or repair of the metal sheet.

* * * * *